(12) United States Patent
Sun et al.

(10) Patent No.: US 8,031,873 B2
(45) Date of Patent: Oct. 4, 2011

(54) FREE-SPACE QUANTUM COMMUNICATION DEVICE WITH ATOMIC FILTERS

(75) Inventors: Xianping Sun, Wuhan (CN); Jun Luo, Wuhan (CN); Mingsheng Zhan, Wuhan (CN)

(73) Assignee: Wuhan Institute of Physics and Mathematics, the Chinese Academy of Sciences (CN)

( * ) Notice: Subject to any disclaimer, the term of this patent is extended or adjusted under 35 U.S.C. 154(b) by 1653 days.

(21) Appl. No.: 11/187,488

(22) Filed: Jul. 22, 2005

(65) Prior Publication Data

US 2007/0030971 A1 Feb. 8, 2007

(51) Int. Cl.
*H04K 1/00* (2006.01)
(52) U.S. Cl. .............................. 380/255; 380/28; 380/256
(58) Field of Classification Search .................. 380/255, 380/28, 256
See application file for complete search history.

(56) References Cited

U.S. PATENT DOCUMENTS

| | | | |
|---|---|---|---|
| 7,317,574 B2 * | 1/2008 | Zoller et al. | 359/577 |
| 7,406,173 B2 * | 7/2008 | Ichimura et al. | 380/28 |

FOREIGN PATENT DOCUMENTS

CN 1545228 A * 11/2004
* cited by examiner

*Primary Examiner* — Peter Poltorak
*Assistant Examiner* — Amare F Tabor
(74) *Attorney, Agent, or Firm* — Clements Bernard PLLC; Gregory N. Clements

(57) ABSTRACT

The present invention discloses a free-space quantum communication device with atomic filters which are used in the field of quantum cryptography. The free-space quantum communication device of the present invention includes a beam splitter (2), two $\lambda/2$ wave plates (3,10), a $\lambda/4$ wave plate (4), two polarization beam splitters (5,11), two atomic filters (6,12), two light couplers (7,13), two optical fibers (8,14) and two single-photon detectors (9,15). In the present invention, the interference filter used in the conventional quantum communication device is replaced by ultra-narrow line-width atomic filters. As the pass-band width of atomic filter is narrower than that of the interference filter in magnitude order of 3 and a light noise rejection ratio of $10^{-5}$ can be obtained, error rate generated by background light noise can be reduced by magnitude order of 2-3. Further, the distance for carrying out free-space quantum communication can be increased. Moreover, the free-space quantum cryptography communication device can normally operate in a good manner under background light noise with sunlight or moonlight.

1 Claim, 1 Drawing Sheet

FREE-SPACE QUANTUM COMMUNICATION DEVICE WITH ATOMIC FILTERS

BACKGROUND OF THE INVENTION

1. Field of the Invention

The present invention relates to a quantum communication device, more particularly, to a free-space quantum communication device with atomic filters.

2. Description of the Related Art

It is known that cryptographic communication is directed to an information transmission mode in which information can be exchanged between two communication parties under a top-secret way. And many countries are paying more attention to the study of the cryptographic communications. Nowadays, cryptography has become an important means for safeguarding information exchange and is widely used by governments, banks, enterprises and individuals. With the rapid development and spread of the computer network and the electronic commerce, people have attached more and more importance on the security of the cryptographic communication system. Due to dramatically rapid development of the computer technology, it is more and more easier for a cryptography to be decoded by an intruder. Accordingly, the classical cryptography has been proven to have its limitation in use. Recently, quantum cryptography has been proposed as a new technology of cryptography in which the security of the information transmission is based on the Heisenberg uncertainty principle in the filed of quantum mechanics. There is no doubt that the quantum communication has become a novel technology in the field of information exchange. In view of the rapid development and wide application of it, people have paid more and more attention on the quantum communication.

Quantum communication uses single photon as carrier of transmission information. Under the condition of free-space communications, birefringence phenomenon for optical spectrum does not occur in the atmosphere. Consequently, photons in polarization states can be transmitted through the atmosphere so that fidelity of transmission of photon states can be achieved.

However, there are two problems that has not been solved until now. One is the signal turbulence of single photon in the transmission medium. The other one relates to detection of single photon under strong background light. During experimental demonstrations of free-space quantum communication based on photon polarization coding, the background light noise is normally filtered by narrow line-width interference filter or by use of an optical-fiber space filtering method. In this way, the above problems are partially solved, thus the above quantum communication can be performed well either at night or daytime.

For example, quantum keys were successfully distributed across the bordering area between Germany and Austria in October of 2002. The transmission rate of the raw key reaches 1.5-2 kHz while error rate is 5%. Further, the quantum keys were distributed across a distance of 23.4 kilometers which is the farthest distance in experimental demonstrations of free-space quantum key distribution. It is proven that there is great possibility for quantum communication to be put into practice.

Free-space quantum communication gains broad perspective on distribution of security keys between earth and satellite or among satellites by using near-earth orbiting satellites and on establishing a global quantum key distribution network. It has achieved a successful distribution with a transmission loss of 27 db. If detection efficiency is further improved and the background light noise is reduced so that transmission loss of 33 db can be endured by the signal channels, it is possible to carry out quantum key distributions across 500-1000 kilometers between the near-earth orbiting satellites.

In usual quantum communication device, the background light noise in free space is filtered generally by an interference filter before faint laser pulse sequence of random polarization coding is incident onto a beam splitter. Because the interference filter usually has a relatively wide pass-band width, noise rejection ratio of the background light is low. Therefore, error rate generated by background light noise in the free-space quantum communication is relatively high.

The atomic filter has the characteristics of high transmission rate, ultra-narrow pass-band width, large acceptance angle and quick response time. Further, the operational frequency is able to be tuned in a predetermined range. As such, the method of atomic filtering is widely used in laser communications, lidar and high-speed modulation of light. Atmosphere laser communication experiment is carried out under the condition that a relatively strong incident laser light with light power of magnitude order of $mW/cm^2$ or $\mu W/cm^2$ is used. In free-space quantum communication, however, the signals are transmitted in a manner of fidelity transmission by means of faint laser pulse on the single photon level.

SUMMARY OF THE INVENTION

The present invention has been made to overcome the above mentioned disadvantages. Accordingly, it is an object of the present invention to provide a device with atomic filters for free-space quantum communication, characterized in that the interference filter used previously in the quantum communication system is replaced by ultra-narrow line-width atomic filters. Therefore, the present invented device has prominent advantages and features over that using interference filter in free-space quantum communication. Specifically, error rate generated by the background light noise can be reduced and then the distance of free-space quantum communication is greatly increased. As such, the quantum communication device can be operated at daytime and under moon light, thus enabling the free-space quantum communication to be put into practice.

Additional aspects and advantages of present invention will be set forth in part in the description that follows, and in part, will be obvious from the description, or may be learned by the practice of the invention.

The forgoing and other aspects of the present invention are achieved by providing the device with atomic filters for free-pace quantum communication, comprising: a beam splitter, two λ/2 wave plates, a λ/4 wave plate, two polarization beam splitters, two atomic filters, two light couplers, two optical fibers and two single-photon detectors, wherein: the first λ/2 wave plate, the λ/4 wave plate, the first polarization beam splitters, the first atomic filter and the first light coupler are disposed on a photon signal channel of the light transmission end of the beam splitter in sequence with their axes being coaxial to that of the beam splitter; the first light coupler is connected to the first single-photon detector through the first optical fiber; the second λ/2 wave plate and the second polarization beam splitter are disposed on a photon signal channel of the light radiating end of the second polarization beam splitter in sequence with their axes being coaxial to a central axis of the reflective surface of the second polarization beam splitter; the second atomic filter and the light coupler are disposed on the photon signal channel of the light reflecting end of the second polarization beam splitter in sequence with their axes being coaxial to a central axis of the reflective surface of the second polarization beam splitter; and the second light coupler is connected to the second single-photon detector through the second optical fiber.

The operation of the quantum communication device in present invention is described as follows. When a random polarization-coded photo pulse sequence that is attenuated to the single-photon level from sender is incident onto the 50% beam splitter, the single photon transmits or reflects in a random manner. After the signal photons transmit through the beam splitter, they are polarized on a polarization surface of the λ/2 wave plates. Next, the signal photons pass through the λ/4 wave plate and turn into circularly polarized photons. Then the signal photons pass through the first polarization beam splitter so that transmitted photons are selected. Thereafter, the signal photons pass through the first atomic filter so as to filter out the background noise generated by sunlight or moonlight. Next, the signal photons are incident into the first optical fiber through the first light coupler and transmitted to the single-photon detector. The single-photon detector receives the photon signal and transforms it into an electrical signal. When the signal photons are reflected by beam splitter, the signal photons pass through the second λ/2 wave plates and are polarized by a polarization surface. Then, the signal photons pass through the second polarization beam splitter so that the reflected photons are selected. Thereafter, the signal photons pass through the second atomic filter so as to filter out the background noise generated by sunlight or moonlight. Then, the signal photons are incident into the second optical fiber through the second light coupler and transmitted into the second single-photon detector. The second single-photon detector receives a photon signal and transforms them into an electrical signal.

Compared with the quantum communication device in the prior art, the quantum communication device of the present invention has the following advantages. Specifically, as the pass-band width of atomic filter is narrower than that of the interference filter by magnitude order of 3 and a background transmission of $10^{-5}$ can be obtained, error rate generated by background light noise can be reduced by magnitude order of 2-3 using the free-space quantum communication system of the present invention. Further, the distance for carrying out free-space quantum communication can be increased. Moreover, the free-space quantum communication device can normally operate in a good manner under background noise with sunlight or moonlight.

BRIEF DESCRIPTION OF THE DRAWINGS

The above and other objects and advantages of the invention will become apparent and readily appreciated from the following description of the preferred embodiments, taken in conjunction with the accompanying drawings, in which.

Figure 1:
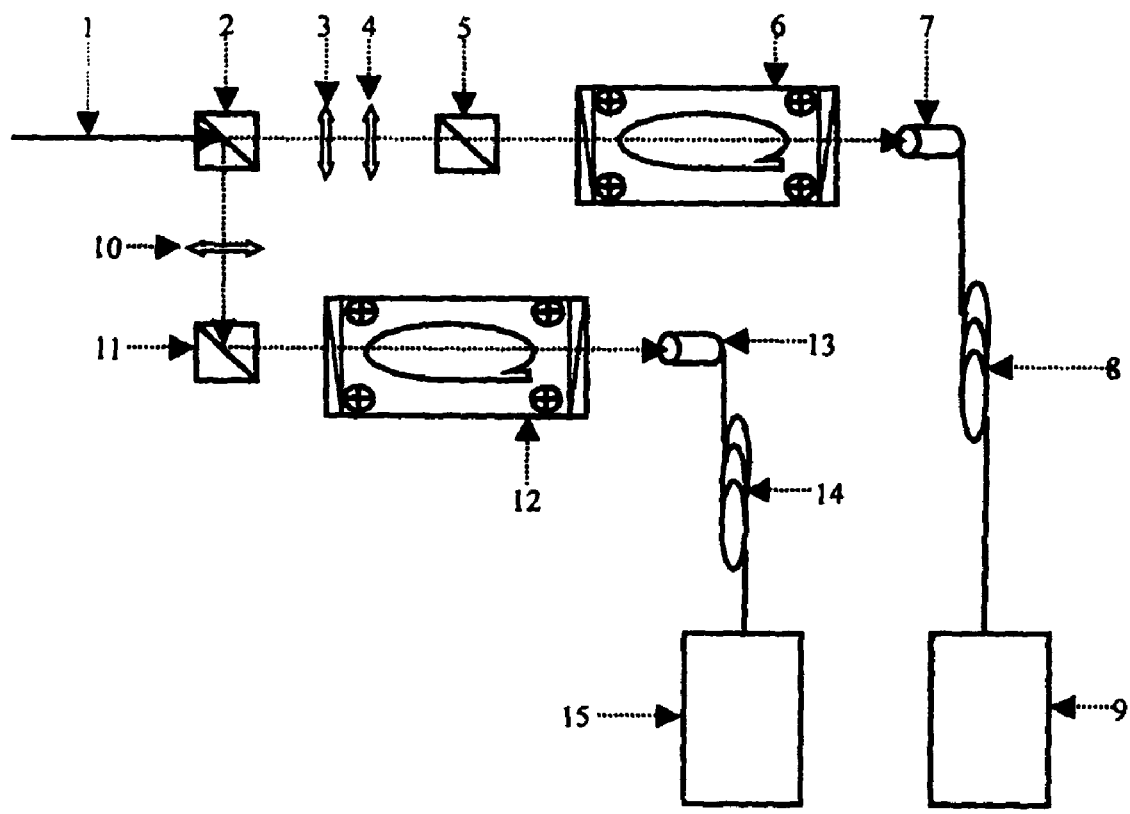
FIG. 1 is a schematic view of the quantum communication device according to an embodiment of the present invention.

The reference numerals illustrated in the drawings designate the components as follows. 1-random faint laser pulse sequence of polarization coding, which is on single-photon level; 2-50% beam splitter; 3 and 10-λ/2 wave plate; 4-λ/4 wave plate; 5 and 11-polarization beam splitter; 6 and 12-atomic filter; 7 and 13-light coupler; 8 and 14-optical fiber; 9 and 15-single-photon detector.

DETAILED DESCRIPTION OF THE PREFERRED EMBODIMENTS

A preferred embodiment of the present invention will be described hereinafter in detail with reference to the attached drawings, wherein the like reference numerals refer to the like elements throughout the specification. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Referring to FIG. 1, the space quantum communication device according to an embodiment of the present invention includes a beam splitter 2, two λ/2 wave plates 3,10, a λ/4 wave plate 4, two polarization beam splitters 5,11, two atomic filters 6,12, two light couplers 7,13, two optical fibers 8,14 and two single-photon detectors 9,15. The first λ/2 wave plate 3, the λ/4 wave plate 4, the first polarization beam splitters 5, the first atomic filter 6 and the first light coupler 7 are disposed on the photon signal channel of the light transmitting end of the beam splitter 2 in sequence with their axes being coaxial to that of the beam splitter 2. The first light coupler 7 is connected to the first single-photon detector 9 through the first optical fiber 8. The second λ/2 wave plate 10 and the second polarization beam splitter 11 are disposed on the photon signal channel of the light radiating end of the second polarization beam splitter 11 in sequence with their axes being coaxial to a central axis of the reflective surface of the second polarization beam splitter 2. The second atomic filter 12 and the light coupler 13 are disposed on the photon signal channel of the light reflecting end of the second polarization beam splitter 11 in sequence with their axes being coaxial to a central axis of the reflective surface of the second polarization beam splitter 11. The second light coupler 13 is connected to the second single-photon detector 15 through the second optical fiber 14.

Next, the operation of the quantum communication device is described as follows. When a random polarization-coded photo pulse sequence 1 that is attenuated to the single-photon level is incident onto the 50% beam splitter 2, the single photon transmits or reflects in a random manner. After the signal photons transmit through the beam splitter 2, they are polarized on a polarization surface of the λ/2 wave plates 3. Next the signal photons pass through the λ/4 wave plate 4 and turn into circularly polarized photons (circle polarization photons). Then the signal photons pass through the first polarization beam splitter 5 so that transmitted photons are selected. Thereafter, the signal photons pass through the first atomic filter 6 so as filter out the background noise generated by sunlight or moonlight. Next, the signal photons are incident into the first optical fiber 8 through the first light coupler 7 and transmitted to the single-photon detector 9. The single-photon detector 9 receives the photon signal and transforms them into an electrical signal. When the signal photons are reflected by the beam splitter 2, the signal photons pass through the second λ/2 wave plates 10 and are polarized by a polarization surface. Then, the signal photons pass through the second polarization beam splitter 11 so that the reflected photons are selected. Thereafter, the signal photons pass through the second atomic filter 12 so as to filter out the background noise generated by sunlight or moonlight. Then, the signal photons are incident into the second optical fiber 14 through the second light coupler 13 and transmitted into the second single-photon detector 15. The second single-photon detector 15 receives photon signal and transforms them into an electrical signal.

Although a preferred embodiment has been shown and described, it would be appreciated by those skilled in the art that changes may be made in these embodiments without departing from the principles and spirit of the invention, the scope of the which is defined in the claims and their equivalents.

What is claimed is:

1. A free-space quantum communication device with atomic filters, compromising: a beam splitter (2), two λ/2 wave plates (3,10), a λ/4 wave plate (4), two polarization beam splitters (5,11), two atomic filters (6,12), two light couplers (7,13), two optical fibers (8,14) and two single-photon detectors (9,15), wherein:

the first λ/2 wave plate (3), the λ/4 wave plate (4), the first polarization beam splitters (5), the first atomic filter (6) and the first light coupler (7) are disposed on a photon signal channel of the light transmitting end of the beam splitter (2) in sequence with their light axes being coaxial to that of the beam splitter (2);

the first light coupler (7) is connected to the first single-photon detector (9) through the first optical fiber (8);

the second λ/2 wave plate (10) and the second polarization beam splitter (11) are disposed on a photon signal channel of the light reflection end of the second polarization beam splitter (11) in sequence with their light axes being coaxial to a central axis of the reflective surface of the second polarization beam splitter (2);

the second atomic filter (12) and the light coupler (13) are disposed on a photon signal channel of the light reflection end of the second polarization beam splitter (11) in sequence with their light axes being coaxial to a central axis of the reflective surface of the second polarization beam splitter (11); and the second light coupler (13) is connected to the second single-photon detector (15) through the second optical fiber (14).

* * * * *